(12) United States Patent
Look et al.

(10) Patent No.: US 9,609,807 B2
(45) Date of Patent: Apr. 4, 2017

(54) AGRICULTURAL HARVESTING MACHINE WITH DISCHARGE ACCELERATOR THAT IS INSTALLED IN ENTIRETY IN AN OPERATING POSITION

(71) Applicant: CLAAS SELBSTFAHRENDE ERNTEMASCHINEN GMBH, Harsewinkel (DE)

(72) Inventors: Stefan Look, Kleve (DE); Lukas Grosse Wienker, Wadersloh (DE); Burkhard Weil, Warendorf (DE)

(73) Assignee: CLAAS Selbstfahrende Erntemaschinen GmbH, Harsewinkel (DE)

(*) Notice: Subject to any disclaimer, the term of this patent is extended or adjusted under 35 U.S.C. 154(b) by 519 days.

(21) Appl. No.: 14/022,578

(22) Filed: Sep. 10, 2013

(65) Prior Publication Data

US 2014/0073381 A1  Mar. 13, 2014

(30) Foreign Application Priority Data

Sep. 13, 2012 (DE) .................. 10 2012 108 542

(51) Int. Cl.
| | | |
|---|---|---|
| A01D 43/077 | (2006.01) | |
| A01F 29/12 | (2006.01) | |
| A01D 75/00 | (2006.01) | |
| A01D 43/08 | (2006.01) | |

(52) U.S. Cl.
CPC ............ *A01D 75/00* (2013.01); *A01D 43/08* (2013.01); *A01D 43/086* (2013.01); *A01F 29/12* (2013.01)

(58) Field of Classification Search
CPC .... A01D 34/125; A01D 43/06; A01D 43/063; A01D 43/08; A01F 29/12
USPC ........ 56/13.3, 13.4, 16.6, 194, 14.3; 460/74, 460/111
See application file for complete search history.

(56) References Cited

U.S. PATENT DOCUMENTS

| | | | | | |
|---|---|---|---|---|---|
| 3,491,523 | A | * | 1/1970 | Bornzin | A01D 41/12 241/42 |
| 4,696,432 | A | * | 9/1987 | Russ | A01D 43/086 241/101.742 |
| 4,735,037 | A | * | 4/1988 | Benter | A01D 43/077 56/13.3 |
| 5,018,344 | A | * | 5/1991 | Samejima | A01D 43/077 56/13.3 |
| 6,719,627 | B2 | * | 4/2004 | Wolters | A01F 12/40 460/111 |
| 8,616,945 | B2 | * | 12/2013 | Ritter | A01D 41/1243 460/111 |
| 2008/0234020 | A1 | * | 9/2008 | Isfort | A01D 75/187 460/112 |

* cited by examiner

*Primary Examiner* — John G Weiss
(74) *Attorney, Agent, or Firm* — Michael J. Striker

(57) ABSTRACT

An agricultural harvesting machine includes a working assembly for processing a crop flow and a discharge accelerator for the processed crop that is designed as a unit to be installed in its entirety into an operating position ($P_B$) downstream of the working assembly in the flow path of the crop stream. The discharge accelerator unit is readily deinstalled from the operating position ($P_B$).

11 Claims, 5 Drawing Sheets

AGRICULTURAL HARVESTING MACHINE WITH DISCHARGE ACCELERATOR THAT IS INSTALLED IN ENTIRETY IN AN OPERATING POSITION

CROSS-REFERENCE TO A RELATED APPLICATION

The invention described and claimed hereinbelow is also described in German Patent Application DE 10 2012 108542.0, filed on Sep. 13, 2012. The German Patent Application, subject matter of which is incorporated herein by reference, provides the basis for a claim of priority of invention under 35 U.S.C. 119(a)-(d).

BACKGROUND OF THE INVENTION

The invention relates to an agricultural harvesting machine, in particular a self-propelled forage harvester comprising at least one working assembly for processing a crop stream and a discharge accelerator for the processed crop.

Agricultural harvesting machines such as self-propelled forage harvesters, in particular, typically comprise a "so-called" discharge accelerator, which is also referred to as a post-accelerator. This discharge accelerator is used to accelerate crop that has been processed by working assemblies (e.g., the intake conveyor and compression mechanism, the chopping assembly, the conditioning device, without limitation) and moves the crop through the machine along a flow path in the form of a continuous crop stream. The speed of the crop stream ensures that the crop will be reliably discharged through a so-called upper discharge chute of the machine. Given that the function of the discharge accelerator is to accelerate the crop to a speed sufficiently high enough to ensure discharge thereof, this discharge accelerator is usually disposed behind the working assemblies processing the crop (with respect to the direction of flow of the crop), i.e., is positioned downstream thereof.

Increasing crop throughputs and increasing desired discharge distances result in a high amount of wear, in particular on the components of the discharge accelerator that come into frictional contact with crop flowing past. Machine components that adjoin the discharge accelerator in the direction of crop flow, such as wearing plates in the conveyor chute (also referred to as the "tower"), also are subject to great wear due to the contact with accelerated crop. For these reasons, and very generally for purposes of maintenance and repair, it may be necessary to access the affected components. In forage harvesters currently available on the market, a relatively great deal of effort is required to access components of the discharge accelerator and/or the conveyor chute adjacent thereto for purposes of repair or maintenance, including replacing the aforementioned components.

In conventional designs of forage harvesters, the discharge accelerator is indeed accessible from a maintenance space located behind the driver's cab. However, the space in this maintenance space is highly limited. Any service or maintenance work that becomes necessary is therefore made difficult and more time-consuming due to the small amount of space that is available, thereby increasing costs. Risks of injury that are not inconsiderable arise due to the unfavorable spatial conditions. In order to completely remove a post-accelerator, it is currently necessary to first partially disassemble the post-accelerator into the components thereof, which requires a great deal of work.

SUMMARY OF THE INVENTION

The present invention overcomes the shortcomings of known arts, such as those mentioned above.

To that end, the present invention provides a harvesting machine as described that is easier to maintain with respect to the discharge accelerator and the adjacent conveyor chute and, to subsequently replace a post-accelerator with another post-accelerator with less effort that would be required using a conventional design.

According to the invention, the harvesting machine has a discharge accelerator designed as a unit that is installed in entirety in an operating position downstream of the working assembly in the flow path of the crop stream and which is deinstalled from this operating position.

It was initially recognized that even the preconditions for performing maintenance and service work on the aforementioned components are unfavorable in known harvesting machines of the aforementioned type. It was considered disruptive, inter alia, that, due to the small amount of space available in the maintenance space, that the components to be maintained or repaired in fact hinder themselves and the work to be performed. To solve this problem, the discharge accelerator of the invention is designed as a closed unit that is installed in entirety in an operating position downstream of the working assembly in the flow path of the crop stream and is deinstalled from this operating position.

The unit of the discharge accelerator advantageously comprises as least one accelerating mechanism (blower) and an enclosing housing, with respect to which the accelerating mechanism is rotatably supported by means of a shaft. The thusly designed unit is installed in the operating position thereof or removed therefrom in its entirety, i.e., without the need to disassemble the unit into individual components in either working procedure. Preferably, further functional elements can be assigned to the unit of the discharge accelerator, such as drive wheels disposed on the shaft for driving the discharge accelerator by means of a drive belt. For example, same might include driven wheels disposed on the shaft for driving further working assemblies, devices for adjusting an effective gap between the accelerating mechanism and the housing, etc.

The handling of the discharge accelerator as a unit permits easier installation and deinstallation into or out of the operating position thereof in the flow path of the crop stream while saving a great deal of time for the assembler. Given that the discharge accelerator is made easier to install and remove, parts of the discharge accelerator that are subject to wear are more easily replaced or maintained and/or, the discharge accelerator is easier to replace in its entirety. In addition, in the deinstalled state other machine components (in particular, a conveyor chute ("tower") disposed downstream of the discharge accelerator in the direction of crop flow), becomes considerably easier to access. This easier access thereby makes it possible to easily replace the wear plates thereof or the entire conveyor chute. Due to shorter "down times" for performing maintenance work, the harvesting machine according to the invention can be operated more cost-effectively overall.

An advantageous development of the harvesting machine is characterized by means for moving the discharge accelerator out of the operating position into an access position within a maintenance space of the harvesting machine. In the simplest case, such an access position is simply that, in this position, the discharge accelerator has no contact with machine-mounted components of the crop flow path (in particular of the conveyor chute), thereby ensuring that these are freely accessible. Furthermore, the access position is advantageously selected such that the discharge accelerator is accessed in this position using a lifting and/or transport device having any type of design and can be removed from the maintenance space.

Different mechanical, hydraulic and/or electromechanical means are feasible for bringing the discharge accelerator from the operating position into the access position. Advantageously, these have a pivotable support of the discharge accelerator relative to the machine frame, in particular the cab carrier of the harvesting machine. A pivotable support makes it possible simply to move the discharge accelerator out of the operating position thereof in a controlled manner. Advantageously, this is implemented in that the discharge accelerator is supported with respect to the machine frame in a manner rotatable about a pivot axis, in order to be swivellable out of the operating position into the access position. The pivot axis could extend, for example, parallel to a drive shaft of a chopping assembly or a conditioning device of the harvesting machine. In such a design, the operating position of the discharge accelerator is located above and in front (relative to the direction of forward travel of the harvesting machine) of the access position.

According to an advantageous development of the harvesting machine, the means for moving the discharge accelerator further comprise a lifting device assigned to the harvesting machine. The lifting device lifts all or part of the weight of the discharge accelerator, at least during the movement out of the operating position into the access position. The lifting device supports the movement of the post-accelerator between the operating position and the access position (and vice versa), thereby ensuring that a change-over is safe despite the considerable weight of the discharge accelerator.

As mentioned above, the discharge accelerator is supported in a pivotable manner with respect to the machine frame. To ensure that operation is safe, the discharge accelerator is locked in the operating position. In particular, the discharge accelerator is screwed to a frame-mounted conveyor chute of the harvesting machine. Further locking possibilities, such as screw connections with the machine frame and/or the cab carrier, may be implemented. Therefore, the lock(s) must be released before the discharge accelerator can be swiveled out of the operating position thereof.

In order to drive a discharge accelerator, this discharge accelerator must be incorporated into a drive train of the harvesting machine. To this end, drive wheels and/or driven wheels are typically disposed on the shaft of the discharge accelerator, which are driven via a belt or drive further assemblies (e.g. a conditioning device) via a belt. The deinstallation of such a discharge accelerator is improved when, in the operating position of the discharge accelerator, a rotatable drive wheel and/or driven wheel assigned to the discharge accelerator is connected in a driving manner to a torque transmission means, but the drive connection to the torque transmission means is interrupted in the access position of the discharge accelerator.

In other words, the arrangement ensures that moving the discharge accelerator out of the operating position into the access position interrupts (or, conversely, establishes) the drive connection thereof. If the torque transmission means is a belt, for example, that wraps around the drive wheel and/or the driven wheel, the drive connection is interrupted by relieving the belt tension. Advantageously, the discharge accelerator can be deinstalled by relieving the belt tension, without the need to remove drive wheels or driven wheels (in particular so-called "pulleys") from the shaft.

Advantageously, the at least one drive wheel and/or driven wheel is supported on a shaft parallel to the pivot axis of the discharge accelerator, wherein the shaft is disposed at a distance from the pivot axis. Given such an arrangement, a pivot motion of the discharge accelerator causes a wrapped-around belt to tighten or loosen, for example.

A belt coupled to the discharge accelerator can serve different purposes. According to an energy-efficient drive configuration, in the operating position, the drive wheel of the discharge accelerator has a drive connection to a main drive belt of the harvesting machine, in order to be driven thereby. Therefore, the discharge accelerator is driven directly by the main drive belt of the harvesting machine.

Furthermore, in the operating position, the driven wheel of the discharge accelerator is connected in a driving manner to an auxiliary drive belt of the harvesting machine, in order to thereby drive at least one further working assembly, such as a conditioning device, for example. Advantageously, the drive wheel and the driven wheel of the discharge accelerator are located on opposite sides of the discharge accelerator, namely on opposite ends of the shaft of the discharge accelerator.

Discharge accelerators are very heavy. In order to safely lift the discharge accelerator in the access position and, for example, move the discharge accelerator out of the maintenance space of the machine, a transport device is brought into the maintenance space. The transport devices are specified for lifting the discharge accelerator, which has been moved into the access position.

Further, the maintenance space is opened in such a way that the discharge accelerator, which has been moved into the access position, is removed from the maintenance space using a floor conveyor and/or any other type of lifting and/or transport device, preferably with the aid of the transport device. The transport device is used to safely lift the discharge accelerator and, to this end, advantageously has an adapted shape that ensures a secure hold of the discharge accelerator and that can be safely lifted and transported by the lifting and/or transport device, such as a forklift.

Alternatively or, in addition to the possibility of moving the discharge accelerator into an access position within the maintenance space, the invention assigns means to the harvesting machine, by way of which the discharge accelerator is moved out of the operating position and/or out of the access position into a maintenance position outside of (e.g., to the side or below), the maintenance space of the harvesting machine.

The agricultural harvesting machine is preferably a self-propelled forage harvester.

BRIEF DESCRIPTION OF THE DRAWINGS

Further features and advantages of the invention will become apparent from the description of embodiments that follows, with reference to the attached figures, wherein.

DETAILED DESCRIPTION OF THE PREFERRED EMBODIMENTS

The following is a detailed description of example embodiments of the invention depicted in the accompanying drawings. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

Figure 1:
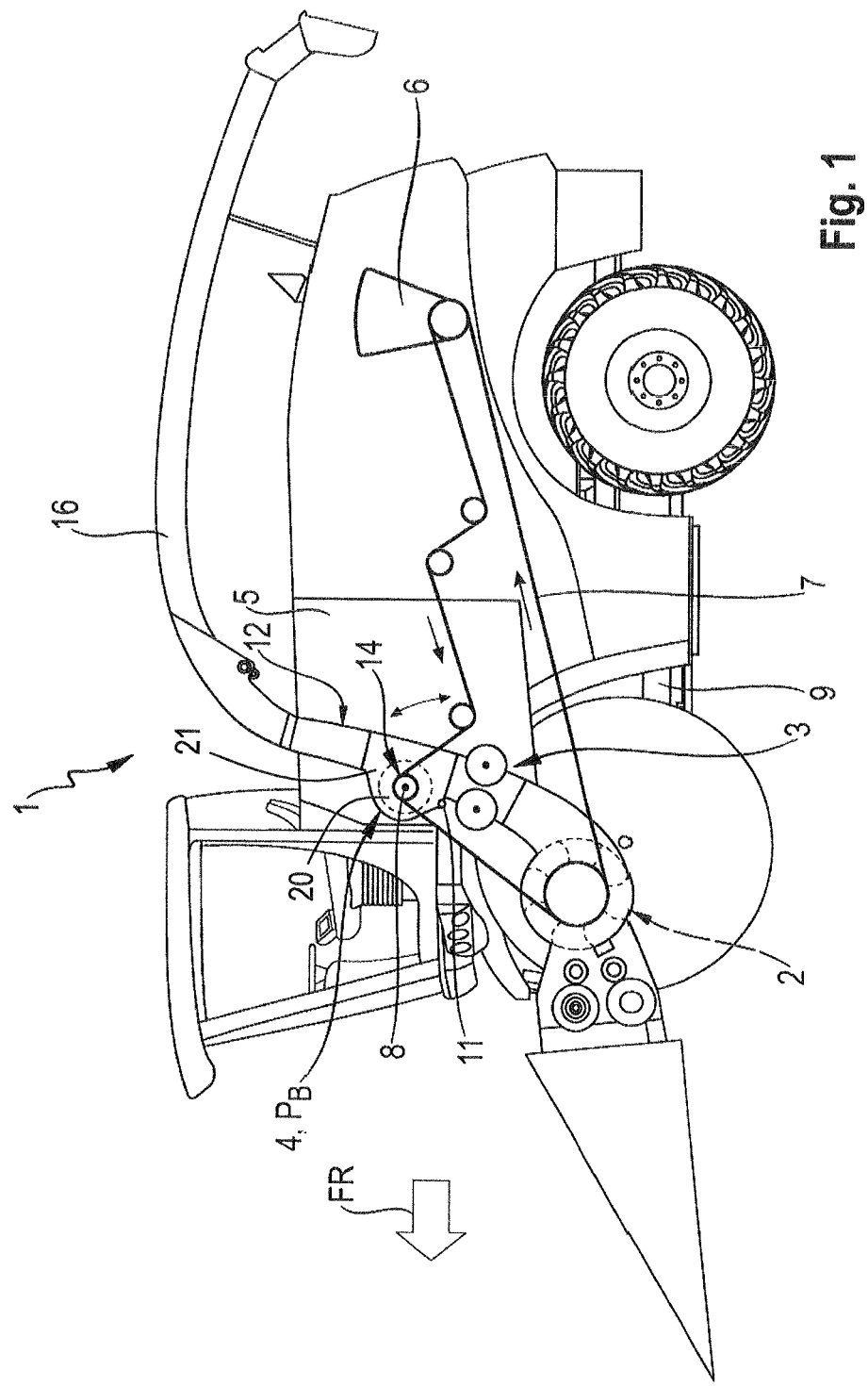
FIG. 1 presents a schematic side view of a self-propelled forage harvester.

FIG. 1 depicts an agricultural harvesting machine in the form of a self-propelled forage harvester 1 in a schematic side view from the left. The forage harvester 1 is equipped with a pair of driven front wheels and steerable rear wheels, and with a front harvesting attachment and an intake conveyor and compression mechanism disposed downstream thereof. As harvesting is carried out across the field in the direction of forward travel FR indicated, crop is fed via the intake conveyor and compression mechanism to a rotating chopper drum 2, where, in interaction with a fixed shear bar, the crop is fragmented (e.g., chopped). The crop then passes, as a continuous crop stream, through a conditioning device 3. Such a conditioning device is optionally installed in the forage harvester 1 and opens corn kernels contained in the crop using two oppositely driven cracker rollers.

In a manner known per se, a discharge accelerator 4 is disposed downstream of crop-processing working assemblies 2, 3 and is used to accelerate the processed crop. The crop passes through an adjoining conveyor chute 12 and is then discharged from the forage harvester 1 via a transfer device in the form of an upper discharge chute 16.

The forage harvester 1 comprises a drive engine 6 disposed at the rear. This drive engine transfers a portion of the drive power thereof via a main drive belt 7 to the chopper drum 2 and to the discharge accelerator 4. To this end, a shaft 8 extending through the discharge accelerator 4 is equipped at one end with a drive wheel 14. The drive wheel is visible in FIG. 1 and is wrapped around partially by the main drive belt 7 in order to be drivable by the drive engine 6 via the main drive belt 7.

The conditioning device 3 is removed from the flow path of the crop in a manner known per se, to permit this conditioning device to be replaced by a chute element, for example, if additional conditioning of the crop is not desired. To this end, the conditioning device 3 is moved toward the rear of the forage harvester 1, out of the flow path of the crop.

The conditioning device 3 and the discharge accelerator 4 are accessible from a maintenance space 5 of the forage harvester 1.

During operation of the forage harvester 1, the friction of the crop on the components (e.g. blower with paddles, housing panels) of the post-accelerator 4 and the conveyor chute 12 adjacent thereto in the downstream direction causes wear, which results in a progressive destruction of the relevant parts subject to wear. Therefore, individual components must be replaced as necessary, in order to ensure safe operation of the forage harvester 1.

To this end, the forage harvester 1 comprises a discharge accelerator 4, which is designed as a unit that can be installed in its entirety in an operating position $P_B$ downstream of the working assembly (see FIG. 1), in the flow path of the crop stream and that can be deinstalled from this operating position $P_B$. Accordingly, the post-accelerator 4 is supported in a pivotable manner with respect to the machine frame 9 of the forage harvester 1, namely in a manner rotatable about a pivot axis 11 extending transversely to the direction of forward travel FR of the forage harvester 1. The unit of the discharge accelerator 4 comprises at least one accelerating mechanism, in the form of a blower 20, and an enclosing housing 21, with respect to which the blower 20 is rotatably supported by means of a shaft 8. Further elements can be assigned to the unit, such as a drive wheel 14 and a driven wheel 15 in the exemplary embodiment shown. The housing 21 bounds, at the underside thereof, the conditioning device 3 and, at the top side thereof, the conveyor chute 12, thereby forming, in the operating position $P_B$ shown in FIG. 1, a closed flow path for the crop conveyed through the machine.

In FIG. 1, the discharge accelerator 4 is located in the flow path of the crop stream when in the operating position $P_B$ thereof. If the conditioning device 3 disposed upstream of the discharge accelerator 4 is removed from the flow path of the crop, the discharge accelerator 4 can be swiveled, after securing locks (not shown here) are released, about the pivot axis 11 out of the operating position $P_B$. This allows the discharge accelerator 4 to first move, in a manner to be described in greater detail, into an access position within the maintenance space 5 and to then be moved entirely out of the machine 1 (maintenance position).

As indicated by reference to FIG. 1, which shows the left side of the machine relative to the direction of forward travel FR of the forage harvester 1, the main drive belt 7 relaxes when the discharge accelerator 4 rotates about the pivot axis 11 in the clockwise direction. The design of the discharge accelerator 4 in understood to make clear that the drive wheel 14 of the discharge accelerator 4 is relieved and, therefore, the discharge accelerator 4 can be removed from the main drive train as a unit without the need to deinstall the drive wheel 14 from the unit of the discharge accelerator 4.

The following FIGS. 2 to 5 explain and highlight the procedure for removing a discharge accelerator 4, as a series of perspective partial views of a forage harvester 1. Since FIGS. 2 to 5 each show a forage harvester 1 in a partial depiction from the right side of the machine (relative to the direction of forward travel FR), it should be noted that machine components of a forage harvester 1 that are not shown in FIGS. 2 to 5 should be included, as depicted in FIG. 1.

Figure 2:
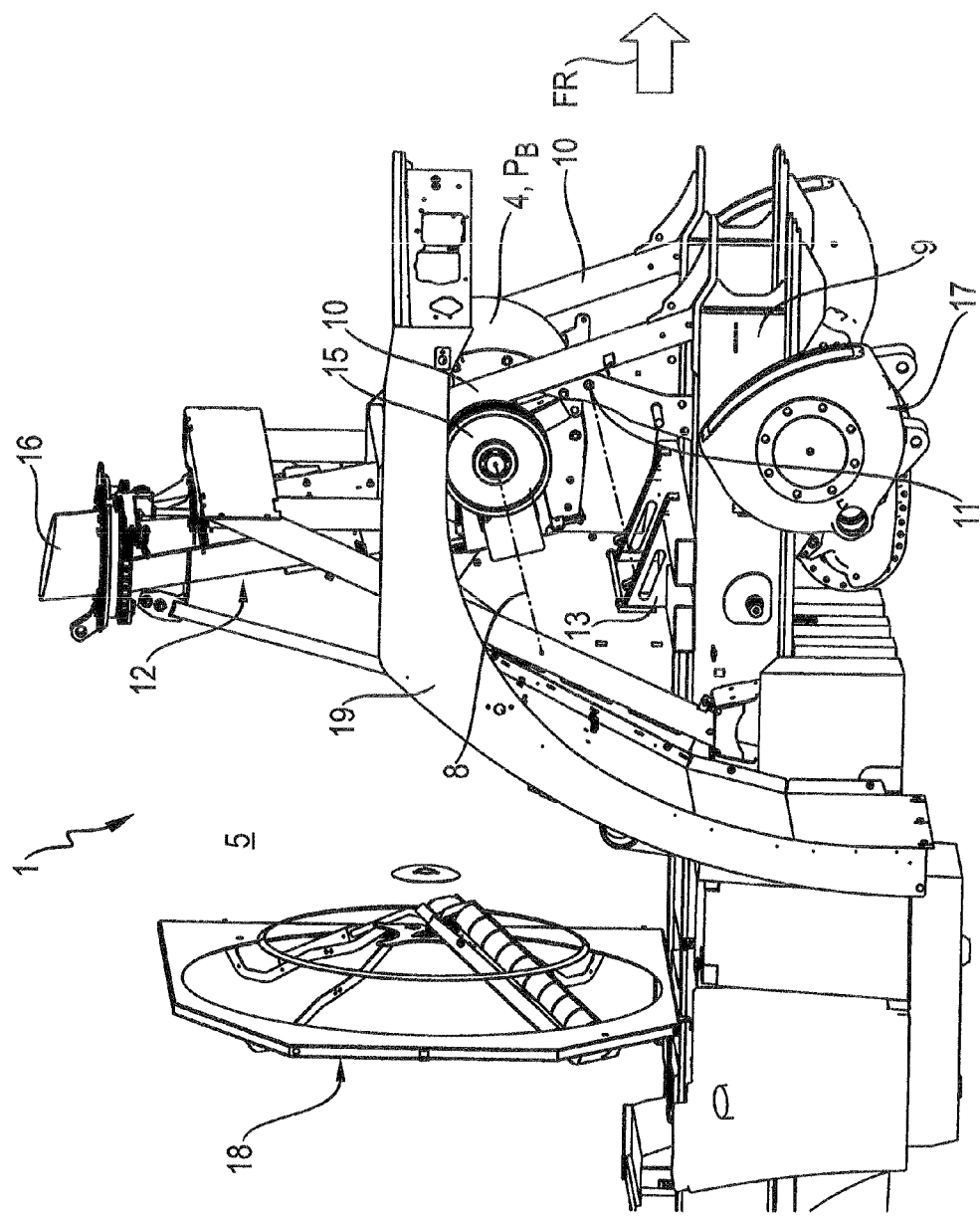
FIG. 2-5 are a set of perspective partial views of a self-propelled forage harvester that respectively depicts various states or installation positions of the discharge accelerator.

FIG. 2 shows a state of the forage harvester 1 corresponding to FIG. 1, in which the discharge accelerator 4 is located in an operating position $P_B$. In the discharge accelerator 4, the shaft 8 extends parallel to the front axle 17 (shown in FIG. 2 without the front wheels), which is transverse to the direction of forward travel FR. That is, the shaft 8 is disposed between two braces of a cab carrier 10, which extend outwardly at a slant, and are pivotably supported with respect to this cab carrier. To this end, the discharge accelerator 4 bears against the cab carrier 10 in a pivot axis 11. A driver's cab, which can be mounted on the cab carrier 10 (not shown in FIG. 2) in order to ensure clarity. For the same reasons, working assemblies disposed upstream of the discharge accelerator, such as the chopper drum and the conditioning device, and other individual parts, such as frame coverings, are not shown in FIGS. 2 to 5 but should be as depicted in FIG. 1.

The view of FIG. 2 shows a driven wheel 15, which is assigned to the discharge accelerator 4, disposed at this end of the shaft 8 in order to drive a conditioning device (cf. FIG. 1) which can be mounted underneath same. In an installed state of the conditioning device (FIG. 1), the driven wheel 15 is wrapped around by a drive belt, which also wraps around a drive wheel of the conditioning device in order to drive this conditioning device.

A conveyor chute 12, which is fixedly connected to the machine frame 9, adjoins the discharge accelerator 4 at the top. This conveyor chute leads, at the upper end thereof, into the upper discharge chute 16 (shown only in part here). A maintenance space 5 is located directly behind the conditioning device (if already removed in FIG. 2 as well), the post-accelerator 4 and the conveyor chute 12. This maintenance space is bounded at the front by the aforementioned crop-stream guiding components, at the back by a perpendicularly oriented radiator 18, and toward the bottom by the machine frame 9. Lateral coverings, which include an access door to permit access by a maintenance technician, and an upper ceiling boundary are not shown (to ensure clarity), but these bound the maintenance space 5 in lateral directions and toward the top.

A platform 19, which is mounted on the side of the machine frame 9, is located on the machine side on the right with respect to the direction of forward travel FR and extends in the shape of a curve approximately equidistantly about the right end of the front axle 17. A right front wheel (which has been removed in the figure), is mounted on the end of the axle 17 and, is therefore enclosed by the platform in the sense of a fender and is covered in a protective manner.

The following preparatory measures must be taken in order to remove the discharge accelerator 4 from the forage harvester 1: Remove the right front wheel (as shown in FIG. 2). Remove a flat covering element, which extends between the machine frame 9 and the platform 19. These measures expose an approximately trapezoidal opening for the maintenance space 5 (next to an access door, which is not shown). The opening is bounded toward the bottom by longitudinal supports of the machine frame 9, toward the top and the rear by the platform 19, and toward the front by the cab carrier 10. The opening formed in this manner makes it possible to remove the complete unit of the discharge accelerator 4 through the opening.

In order to move the discharge accelerator 4 out of the operating position $P_B$ (shown in FIG. 2), the screw connection (not shown) thereof to the conveyor chute 12 is released. Further screw connections may need to be released, e.g., with respect to the cab carrier 10. Once the screw connections have been released, the unit of the discharge accelerator 4 is only connected to the machine frame 9, namely the cab carrier 10 mounted to the machine frame in this case, in a manner rotatable about a pivot axis 11. Since the pivot point (axis 11) is located clearly in front of the center of gravity of the discharge accelerator 4 relative to the direction of forward travel FR, the discharge accelerator 4 now tends to tilt downward about the pivot axis 11 in the counterclockwise direction (from the right, according to the view in FIGS. 2 to 5). This is due to the force of gravity. In order to ensure that the movement does not cause damage, a lifting device (not shown; e.g., a block and pulley), which bears against the side of the machine is used. The lifting device is designed for at least partially lifting the weight of the discharge accelerator 4 during the movement out of the operating position $P_B$.

As further shown in FIG. 2, a transport device 13 has already been moved into the maintenance space 5. This is an auxiliary device that is suitable for safely lifting the discharge accelerator 4. The transport device 13 comprises, on the underside thereof, two square tubes, which extend parallel to one another and are separated by a distance, and can therefore be safely lifted by a forklift, for example, by means of the tines thereof. On the top side thereof, the transport device 13 has a shape that is adapted to the underside of the discharge accelerator 4.

Figure 3:
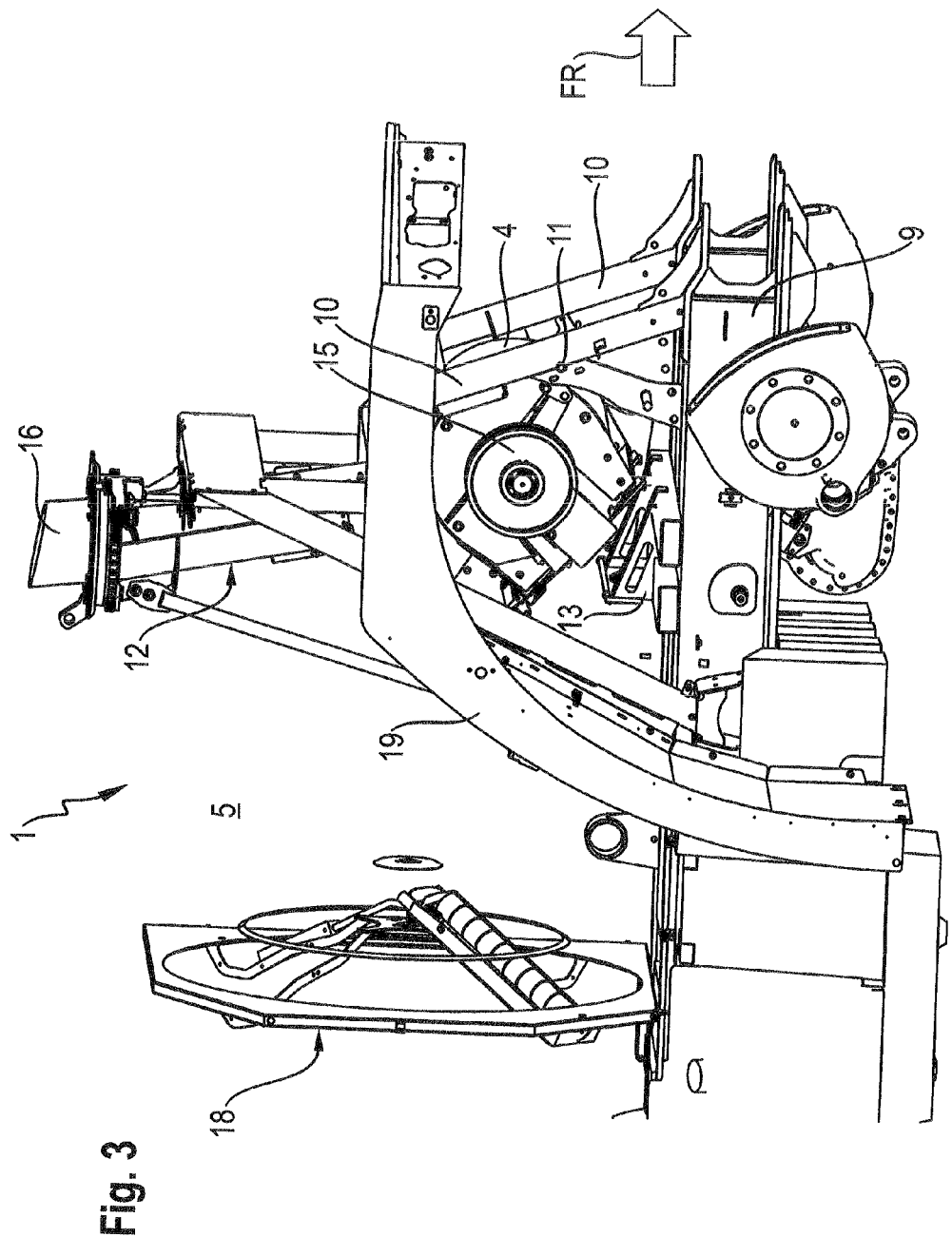

FIG. 3 depicts the discharge accelerator 4 in a position, which (compared to the state according to FIG. 2) is slightly tilted out of the operating position $P_B$ in the counterclockwise direction. Therefore, the discharge accelerator 4 is no longer located in the flow path of the crop stream.

Figure 4:
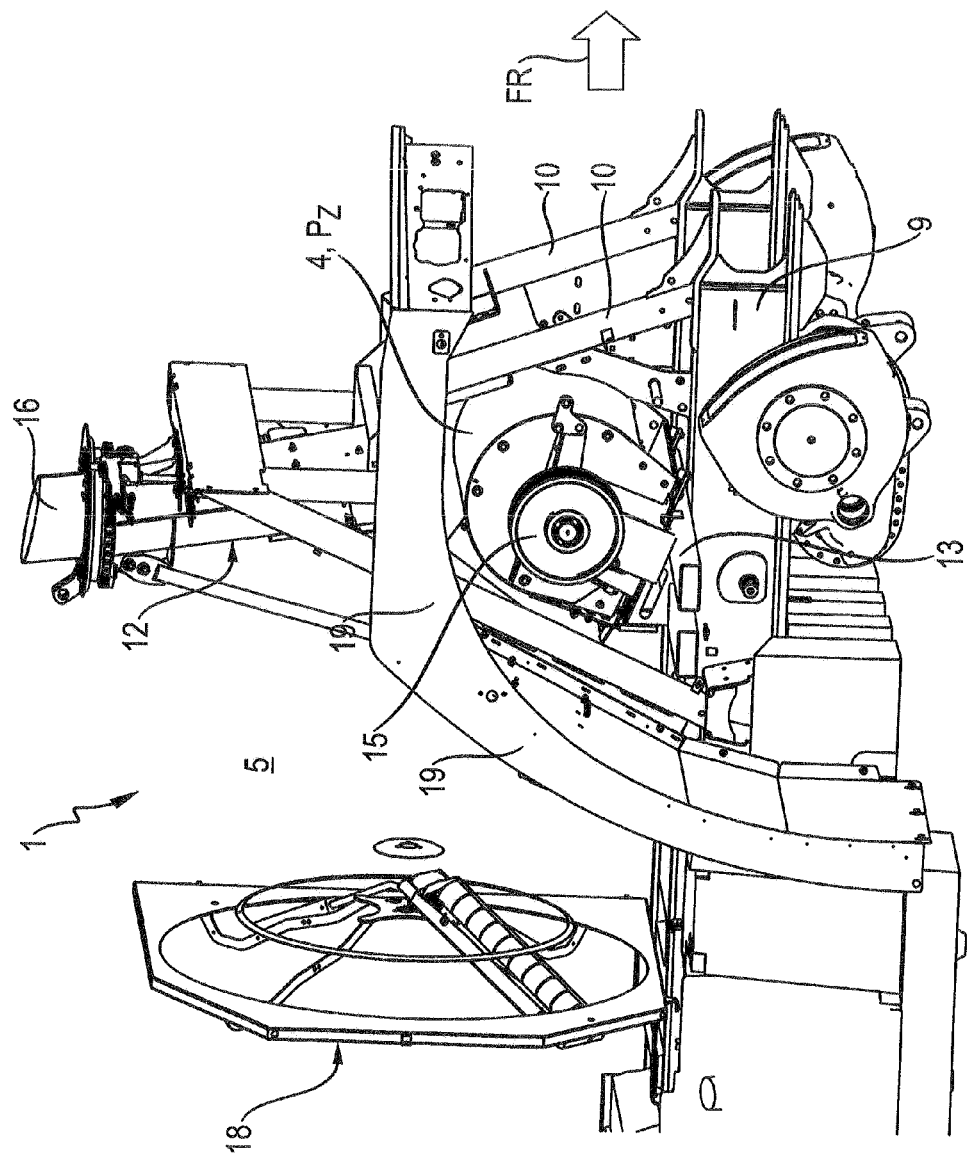

As shown in FIG. 4, the discharge accelerator 4 is rotated about the pivot axis 11 far enough to now lie on the transport device 13 in an access position $P_Z$, which has been reached. The discharge accelerator 4 still is located within the maintenance space 5 of the forage harvester, wherein, in this position $P_Z$, access is improved to the discharge accelerator 4 and to other components of the forage harvester 1. This is particularly the case for the components of the conveyor chute 12, such as adjacent wear plates. Simple maintenance work may even be performed in this state.

Figure 5:
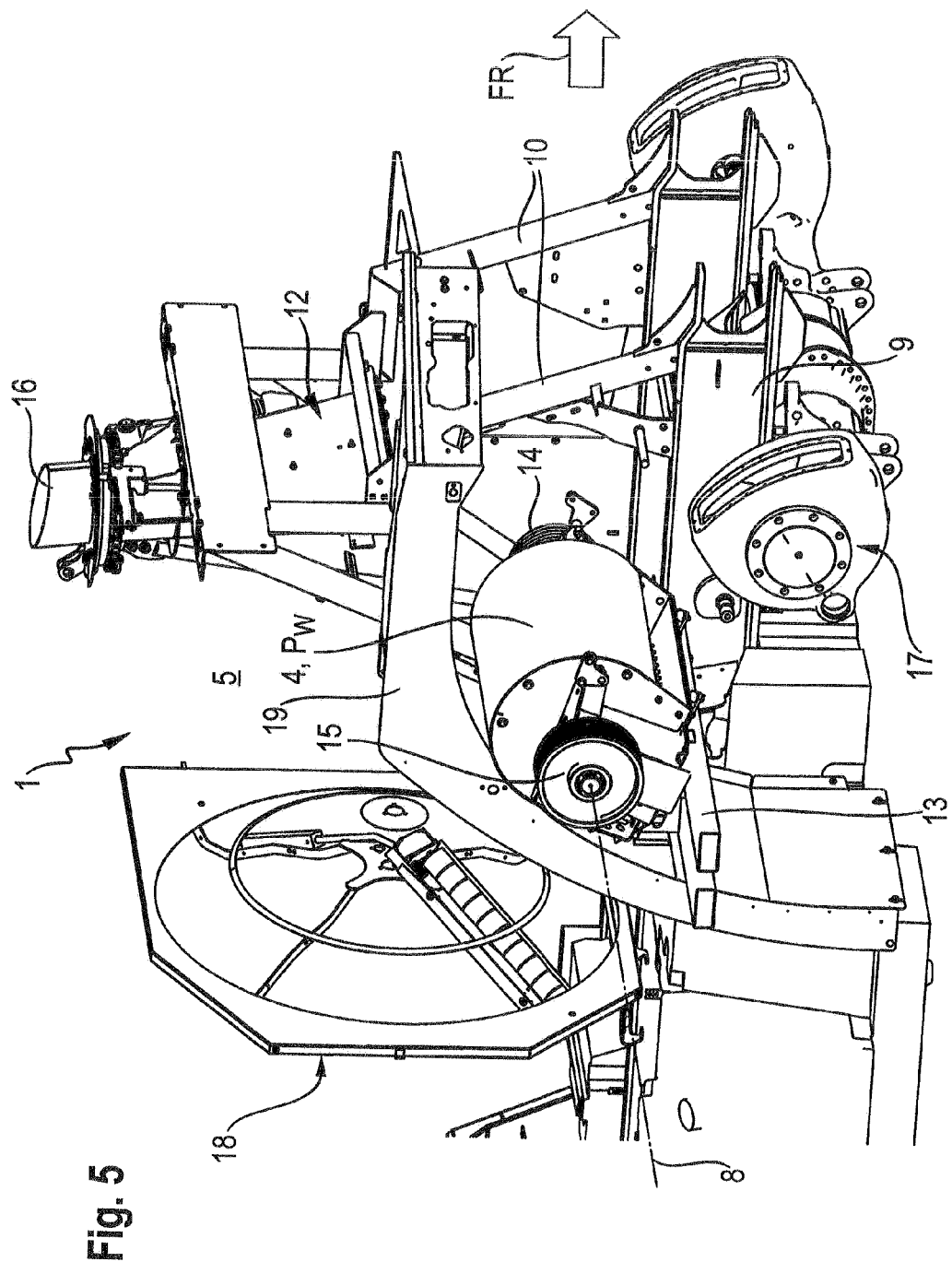

As shown in FIG. 5, the discharge accelerator 4 (which is located in the access position $P_Z$), is removed from the maintenance space 5 in a subsequent step with the aid of the transport device 13, e.g., using a floor conveyor and/or any other type of lifting and/or transport device. To this end, the discharge accelerator 4 is moved laterally out of the open maintenance space 5 and emerges from the machine underneath the platform 19. Another type of lifting or transport device could be a rail system (preferably telescopic), for example. In the maintenance position $P_W$ outside of the machine 1, which has been reached, any type of maintenance work can be performed on the discharge accelerator 4 in any of the cases, without spatial restrictions.

In the deinstalled state of the discharge accelerator 4, maintenance work also can be more easily performed on the forage harvester 1, which is advantageous. For example, wear plates of the conveyor chute 12 ("tower") are more easily and rapidly replaced due to considerably improved access. Due to the design of the discharge accelerator 4 as a closed unit and due to a clear interface with respect to the unit of the conveyor chute 12, these two assemblies are independent of one another. Therefore, the conveyor chute 12 also is easily removed.

The harvesting machine 1 described herein advantageously makes it possible to quickly replace the discharge accelerator 4. The invention makes it feasible, for example, to keep a (further) discharge accelerator 4 on hand so that a complete replacement can be carried out if damage (e.g. caused by foreign objects or due to high wear) occurs during the harvest. The down time of the machine is therefore minimized, since replacement can be carried out easily and quickly.

As an alternative to the lateral removal of the discharge accelerator 4, through an opening in the maintenance space 5 created underneath the platform, the invention also discloses to remove the discharge accelerator 4 from the maintenance space 5 in the downward direction. To this end, a related opening is provided in the base of the maintenance space 5, through which the discharge accelerator 4 can be moved as a unit.

LIST OF REFERENCE SIGNS 1 forage harvester
2 chopper drum
3 conditioning device
4 discharge accelerator 5 maintenance space
6 drive engine
7 main drive belt
8 shaft
9 machine frame
10 cab carrier
11 pivot axis
12 conveyor chute
13 transport device
14 drive wheel
15 driven wheel
16 upper discharge chute
17 front axle
18 radiator
19 platform
20 blower
21 housing
$P_B$ operating position
$P_Z$ access position
$P_W$ maintenance position
FR direction of forward travel As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:

1. An agricultural harvesting machine, comprising:
at least one working assembly (2, 3) for processing a crop stream;
a discharge accelerator (4) for the processed crop configured to be installed in entirety in an operating position ($P_B$) downstream of the at least one working assembly (2, 3) in a flow path of the crop stream and, to be removable from the operating position ($P_B$);
a conveyor chute (12); and
means for moving the discharge accelerator (4) out of the operating position ($P_B$) into an access position ($P_Z$) within a maintenance space (5) of the harvesting machine (1);
wherein the means for moving comprises a pivotable support of the discharge accelerator (4) with respect to a machine frame (9) in a form of a cab carrier (10) of the harvesting machine (1);
wherein the discharge accelerator (4) comprises at least one accelerating mechanism (20) and an enclosing housing (21), wherein the accelerating mechanism (20) is rotatably supported by a shaft (8) extending in parallel to a front axis of the agricultural harvesting machine; and
wherein the conveyor chute (12) adjoins the discharge accelerator (4).

2. The agricultural harvesting machine according to claim 1, wherein the discharge accelerator (4) is supported with respect to the machine frame (9) in a manner rotatable about a pivot axis (11), in order to be swivellable out of the operating position ($P_B$) into the access position ($P_Z$).

3. The agricultural harvesting machine according to claim 2, wherein a frame-mounted conveyor chute (12) of the harvesting machine (1), which is fixedly mounted to the machine frame (9), adjoins the discharge accelerator (4) at the top.

4. The agricultural harvesting machine according to claim 1, wherein at least one rotatable drive wheel (14), driven wheel (15) or both is assigned to the discharge accelerator (4), which, in the operating position ($P_B$) of the discharge accelerator (4), is operatively connected to a main drive belt (7), and wherein the operable connection to the main drive belt (7) is interrupted in an access position ($P_Z$) of the discharge accelerator (4).

5. The agricultural harvesting machine according to claim 4, wherein the at least one drive wheel (14) is supported on a shaft (8) parallel to a pivot axis (11) of the discharge accelerator (4) and wherein the shaft is disposed at a distance from the pivot axis (11).

6. The agricultural harvesting machine according to claim 4, wherein in the operating position ($P_B$), the drive wheel (14) of the discharge accelerator (4) has a drive connection to the main drive belt (7) of the harvesting machine (1), in order to be driven thereby.

7. The agricultural harvesting machine according to claim 4, wherein in the operating position ($P_B$), the driven wheel (15) of the discharge accelerator (4) has a drive connection to an auxiliary drive belt of the harvesting machine (1), in order to thereby drive at least one further working assembly (3).

8. The agricultural harvesting machine according to claim 1, further comprising a transport device (13), wherein the transport device (13) is brought into the maintenance space (5) in order to lift the discharge accelerator (4), which has been moved into the access position ($P_Z$).

9. The agricultural harvesting machine according to claim 1, wherein the means for moving the discharge accelerator (4) moves the discharge accelerator (4) out of the access position ($P_Z$) into a maintenance position ($P_W$) outside of the maintenance space (5) of the harvesting machine (1).

10. The agricultural harvesting machine according to claim 1, configured as a self-propelled forage harvester (1).

11. An agricultural machine embodying a field chopper, the field chopper comprising:
at least one working assembly (2, 3) for processing a crop stream;
a discharge accelerator (4) for the processed crop configured to be installed in entirety in an operating position ($P_B$) downstream of the at least one working assembly (2, 3) in a flow path of the crop stream and, to be removable from the operating position ($P_B$);
a conveyor chute (12); and
means for moving the discharge accelerator (4) out of the operating position ($P_B$) into an access position ($P_Z$) within a maintenance space (5) of the field chopper;
wherein the means for moving comprises a pivotable support of the discharge accelerator (4) with respect to a machine frame (9) in a form of a cab carrier (10) of the field chopper;
wherein the discharge accelerator (4) comprises at least one accelerating mechanism (20) and an enclosing housing (21), wherein the accelerating mechanism (20) is rotatably supported by a shaft (8) extending in parallel to a front axis of the field chopper; and
wherein the conveyor chute (12) adjoins the discharge accelerator (4).

* * * * *